Dec. 25, 1962  P. DORNIER ET AL  3,070,327
AIRPLANE ADAPTED TO START AND LAND ON AN AIR CUSHION
Filed Aug. 2, 1961

Inventors.
PETER DORNIER.
EUGEN JÄGER.
KARL WIEDEMER.
By K. B. Mayr
Attorney.

United States Patent Office 3,070,327
Patented Dec. 25, 1962

3,070,327
AIRPLANE ADAPTED TO START AND LAND ON AN AIR CUSHION
Peter Dornier and Eugen Jager, Friedrichshafen, and Karl Wiedemer, Siegen, Westphalia, Germany, assignors to Dornier-Werke G.m.b.H., Friedrichshafen, Germany, a firm of Germany
Filed Aug. 2, 1961, Ser. No. 158,149
Claims priority, application Germany Aug. 6, 1960
18 Claims. (Cl. 244—12)

The invention relates to an airplane capable of starting and landing in substantially vertical direction on an air cushion produced by transverse flow blowers.

The invention is a further development of the airplane disclosed in patent application Serial No. 121,126, filed June 30, 1961. In this airplane transverse flow blowers are entirely or partly built into the wings with the rotation axes parallel to the wingspread and air is drawn from the top side of the wings and exhausted to the underside of the wings to produce an air cushion between the wings and the ground. This air cushion lifts the airplane from and supports the airplane close to the ground for a normal horizontal take-off. During forward flight lift is produced in the conventional manner by the wings. An air cushion is also produced in the above described manner for the landing operation. In order to increase the effect of the air cushion flaps or the like are adjustably connected to the wings at or near the leading and the trailing edges which flaps form aprons confining the space wherein the air cushion develops. This space is laterally confined by sheetlike elements extending downward from the underside of the wings and also serving as skids for starting and landing.

It is an object of the present invention to provide an airplane capable to start and land on an air cushion and adapted to securely and smoothly absorb the landing shock. The lateral vertical sheetlike elements which are rigidly connected to the airplane wings and form skids cause objectionable, if not dangerous, lateral shocks, if the skids do not uniformly touch the ground. According to the invention the fuselage of the airplane is used and suitably constructed to effectively absorb the landing shock. In an embodiment of the invention a main landing skid adapted to absorb substantially the entire landing shock is provided at the underside of the fuselage and may be made resilient in a conventional manner. This main landing skid relieves the skids formed by the lateral confining elements for the air cushion so that these elements serve primarily for confining the space for the air cushion and serve only secondarily as supports of the airplane. The lateral skids, therefore, can be made very light. The airplane is preferably constructed as a mid-wing monoplane wherein the bottom of the fuselage is lower than the underside of the wings.

Without departing from the scope of the invention the fuselage may be constructed in a different manner for absorbing the main landing shock. Instead of providing one main landing skid below the fuselage two parallel landing skids may be provided at the sides of the fuselage for increasing stability of the position of the airplane on the ground. In this case the elements for laterally confining the air cushion need not be formed as skids but can be constructed exclusively for confining the air cushion. Floats may be connected to the fuselage or the fuselage itself may be built to float in order to afford landing on water, swamps, snow fields and the like. In lieu of the main landing skid wheels or rollers may be mounted on the fuselage for absorbing the landing shock and improving movability of the airplane on the ground. The fuselage may be adapted in many ways to absorb the main landing shock since the problem of confining the air cushion is solved by different means.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Like parts are designated by like numerals in the several figures.

Figure 1:
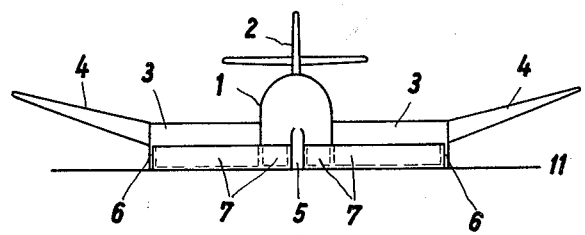
FIG. 1 is a schematic front view of an airplane according to the invention.

Referring more particularly to FIG. 1 of the drawing, numeral 1 designates the fuselage of a low-wing monoplane, the fuselage being mounted on central wing portions 3. To the outside of each wing portion 3 an outer wing portion 4 is connected. Numeral 2 designates a tail unit. Vertical sheet elements 6 are provided at the outside of the inner wing portions 3 parallel to the longitudinal axis of the airplane. These elements serve to laterally confine a space below the wing portions 3 and the fuselage 1 to retain an air cushion. The elements 6 also serve as auxiliary skids. The main landing shock is absorbed by a center skid 5 at the underside of the fuselage 1. The skid 5 is broad and of rigid construction so that it can also serve as a snow runner. The skid 5 may be yieldably constructed in a conventional manner. The lateral elements 6 may be yieldable in a vertical direction. These lateral elements can be constructed very lightly because their main purpose is to confine a space below the airplane for developing an air cushion; their action as skids is only secondary. The lateral elements 6 preferably comprise a lower portion provided with a skid for making contact with the ground 11. This lower portion is resiliently connected to an upper portion which is made fast on a wing and the lower portion is guided to move vertically and, if desired, also longitudinally of and parallel and close to the upper portion. To obtain the desired resiliency springs are provided which, even when fully expanded, extend the lower portion of the lateral elements below the upper portion to form an increased continuous lateral confinement for the air cushion when the airplane leaves the ground. Flaps 7 are adjustably connected to the central wing portions near the leading and trailing edges thereof. Such flaps may also be connected to the underside of the fuselage. The flaps 7 serve for confining the front and the rear of the space below the aircraft wherein an air cushion is developed.

Figure 2:
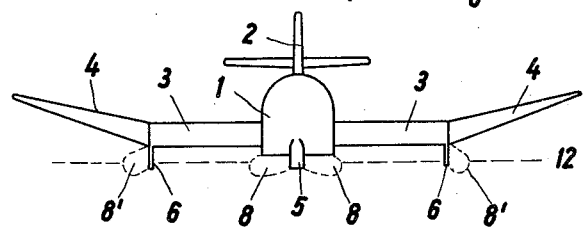
FIG. 2 is a schematic front view of a modified airplane according to the invention.

The modification of the airplane according to the invention shown in FIG. 2 is suitable for starting and landing the airplane on water. Floats 8 are provided on either side of a skid 5 placed at the underside of the fuselage for absorbing the main landing shock. The floats are preferably not permanently filled with air but are inflated as needed to the size indicated by dotted lines in FIG. 2. Inflatable bodies 8' may also be provided adjacent to the lateral air cushion confining elements 6 to serve as auxiliary floats. To make the modification shown in FIG. 2 still more suitable to serve as a seaplane, the fuselage itself may be constructed floatable and have the form of a boat.

It may be of advantage to place the underside of the fuselage 1 lower than the underside of the wings so that the airplane is not a pure low-wing monoplane, but is an intermediary between a low-wing monoplane and a mid-wing monoplane. This has the advantage that the main landing skid or float does not need to project far from the underside of the fuselage and the latter can easily be constructed to float. In this arrangment placement of the machinery driving the blowers for providing lift and forward thrust is also facilitated and improved boarding facilities and visibility can be provided.

Figure 3:
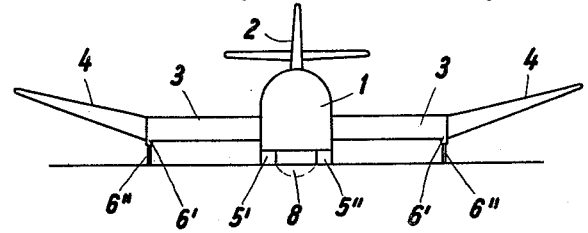
FIGS. 3 and 4 are schematic front views of further modifications of an airplane according to the invention.

Instead of placing a central skid underneath the fuselage, two skids 5' and 5" can be provided, one on each side of the fuselage, as shown in FIG. 3. This arrangement provides satisfactory stability of the airplane on the ground so that lateral auxiliary skids may be omitted. The lateral sheetlike elements need, therefore, not be constructed to support and serve as skids but merely to laterally confine the space below the wings wherein the air cushion develops. They may, therefore, be very light. If desired, they may be made yieldable in a vertical direction as described above. FIG. 3 shows a design wherein only a stump 6' is rigidly connected to the underside of the wing, a sheetlike element 6" being telescopically connected to the stump 6'. The element 6" may be retracted into the stump 6' when the airplane is in normal horizontal flight and no lateral confinement of an air cushion is required. The element 6" may be resiliently connected to the stump 6' or to the wings. If desired, a float 8 may be placed in the space between the skids 5' and 5".

Figure 4:
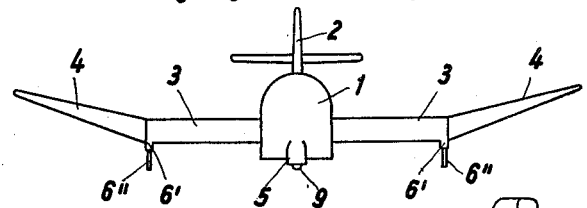
Figure 5:
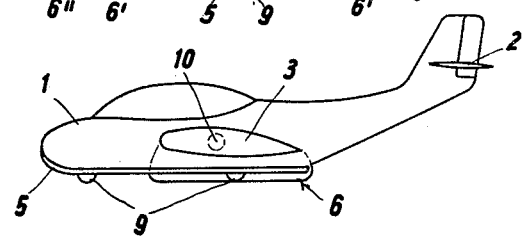
FIG. 5 is a schematic side elevation of the airplane shown in FIG. 4.

Since the skid or skids provided at the underside of the fuselage do not take part in confining a space for an air cushion wheels or rollers 9 may be provided as shown in FIGS. 4 and 5. These wheels or rollers may be combined with a central skid 5 and so arranged that they hardly project from the skid. In this way not only the main landing shock is effectively absorbed by the wheel or wheels 9, but the movability of the airplane on the ground is improved. The rollers may be arranged coaxially in pairs. If desired, at least one of the rollers may be steerable to further improve maneuverability of the airplane on the ground.

In the side elevation, FIG. 5, of the airplane according to FIG. 4 the outer part of the left central wing portion 3 is cut away. A transverse flow blower 10 is arranged within the central wing portion 3 with the axis of rotation parallel to the wingspread for drawing air from above the wing and discharging air below the wing for producing an air cushion below the wing when starting or landing and for producing forward thrust during normal horizontal flight. FIG. 5 shows the right lateral sheetlike element 6 which comprises the portions 6' and 6" shown in FIG. 4. The flaps or aprons 7 shown in FIG. 1 and also arranged in an airplane of the type shown in FIGS. 4 and 5 are not shown in these figures since they do not form part of the present invention.

Figure 6:
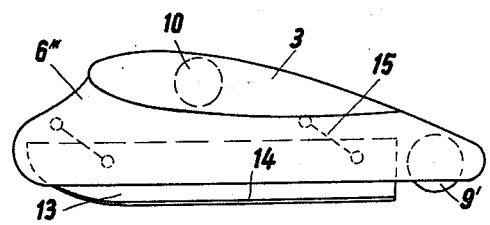
FIG. 6 is a schematic side elevation of another modification of an airplane according to the invention.

FIG. 6 shows an example for the yieldable construction of the lateral air cushion confining elements. It is known to provide yieldable landing skids. These landing skids, however, are not also used for confining an air cushion below a wing. In order to effect satisfactory confinement of the air cushion during lifting of the airplane from the ground the lateral sheetlike elements are made in two portions, the upper one being connected to the wing and the lower one being resiliently connected to the upper one. The spring or springs which make the connection resilient are so designed that upon complete expansion the lower portion is extended downward from the upper portion to provide therewith an increased continuous air cushion confining sheetlike element until the airplane has reached a predetermined elevation above the ground. The lower portion comprises a skid mounted to the lower edge of a sheetlike element which is connected to the upper portion and so guided that it is movable in parallel relation and close thereto. The lower portion may be telescopically connected to the upper portion.

FIG. 6 shows a skid 14 connected to the lower edge of a lower portion 13 of a sheetlike element which is connected in the aforedescribed manner to an upper portion 6''' of the lateral sheetlike element, the portion 6''' being rigidly connected to the outer end of a central wing portion 3. Resilient means or a spring 15 are interposed between the element 13 and the element 6.

The spring 15 expands or assumes a vertical position when the airplane leaves the ground, extending the element 13 below the element 6''' so that an increased continuous air cushion confining wall is formed. Upon complete expansion or release of the spring 15 and continued lift of the airplane above the ground the skid 14 leaves the ground.

The air cushion which is laterally confined by the elements 6''', 13 is also confined by flaps extending from the wing in the neighborhood of the leading and trailing edges thereof. These flaps are not illustrated and may be made resilient or consist partly or entirely of elastic material as shown in copending application Serial No. 121,126, filed June 30, 1961. The invention is not limited to any particular construction of the upper and lower portions of the lateral sheetlike elements. The construction, of course must be such that a continuous wall is formed by both parts for laterally confining the air cushion. The invention is also not limited to particular springs or resilient means 15. Any spring arrangement which affords vertical movement of the portion 13 relative to the portion 6''', or a combination of vertical and longitudinal movement may be used.

Close to the rear end of the skid 14 and of the lateral air cushion confining element a roller or small wheel 9' may be arranged, only a small part of the circumference of which is lower than the skid 14 when the portion 13 is closest to the wing 3 and the spring 15 is fully compressed or tensed. The roller or wheel 9' may be resiliently supported or connected to the resiliently supported portion 13.

Resilient skids forming part of the lateral air cushion confining elements may be used for absorbing the main landing shock, or may be used in an arrangement where the main landing shock is absorbed by a main central skid as shown in FIGS. 1 to 4. In the latter case the lateral sheetlike elements can be built very light and skids thereon may be entirely omitted. In that case the lateral sheetlike elements serve exclusively for laterally confining the air cushion and the weight of the lateral elements, which may be made vertically yieldable, can be still more reduced.

We claim:

1. In an airplane having a fuselage and wings connected thereto and capable of starting and landing on an air cushion produced by transverse flow blowers built into the wings with the rotation axes substantially parallel to the wingspread, the air cushion being confined in a space below the wings by sheetlike elements downwardly extending from and adjustably connected to the wings adjacent to the leading and trailing edges thereof and by lateral sheetlike elements downwardy extending from and being rigidly connected to the wings: said fuselage being provided with means for absorbing the main landing shock.

2. In an airplane as defined in claim 1 and wherein said fuselage is floatable.

3. In an airplane as defined in claim 1, a landing skid connected to the underside of the fuselage.

4. In an airplane according to claim 3, a float placed on either side of said landing skid.

5. In an airplane as defined in claim 1, a landing skid connected to either side of said fuselage.

6. In an airplane according to claim 5, a float placed between said landing skids and on the underside of the fuselage.

7. In an airplane as defined in claim 1, at least one roller connected to the underside of the fuselage for absorbing the landing shock.

8. In an airplane as defined in claim 1, at least one steerable roller connected to the underside of the fuselage for absorbing the landing shock.

9. In an airplane as defined in claim 1, a landing skid connected to the underside of the fuselage, and a roller connected to said landing skid, a portion of the circumference of said roller projecting below said landing skid.

10. In an airplane as defined in claim 1, a landing skid connected to the underside of the fuselage, and a steerable roller connected to said landing skid, a portion of the circumference of said roller projecting below said landing skid.

11. In an airplane as defined in claim 1 and wherein said fuselage has an underside placed lower than the underside of said wings.

12. An airplane capable of starting and landing in a vertical direction and comprising a fuselage provided with skid means for absorbing the main landing shock, wings laterally extending therefrom, transverse flow blowers built into said wings with the rotation axes substantially parallel to the wingspread for receiving air from above the wings and discharging the air at the underside of the wings, and means for confining a space below said wings for affording production of an air cushion therein, said confining means including sheetlike elements downwardly extending from and adjustably connected to the wings adjacent to the leading and trailing edges thereof, and lateral sheetlike elements extending substantially parallel to the longitudinal axis of the airplane and downwardly from and connected to the wings, said lateral sheetlike elements forming auxiliary skids and having at least a portion yieldable in a vertical direction.

13. An airplane as defined in claim 12 including a roller connected to the rear portion of each of said lateral sheetlike elements.

14. An airplane according to claim 12 wherein said lateral sheetlike elements include floats.

15. An airplane as defined in claim 12 wherein said lateral sheetlike elements have an upper portion rigidly connected to said wings, and have a lower portion resiliently connected to said upper portion for extending said lower portion below said upper portion to form an increased continuous air cushion confining sheetlike element when the airplane leaves the ground.

16. An airplane according to claim 15 wherein said lower portion is guided to move in parallel and close relation to the upper portion.

17. An airplane according to claim 15 wherein said portions of said sheetlike elements are telescopically connected.

18. An airplane according to claim 15 wherein said lower portion is connected to said upper portion to perform a combined longitudinal and vertical movement relative to said upper portion upon engagement and disengagement of the ground by the airplane.

References Cited in the file of this patent

UNITED STATES PATENTS

| | | |
|---|---|---|
| 2,364,676 | Warner | Dec. 12, 1944 |
| 2,977,073 | Ditter | Mar. 28, 1961 |
| 2,989,269 | Lebel | June 20, 1961 |
| 3,013,744 | Klapproth | Dec. 19, 1961 |
| 3,026,066 | Coates | Mar. 20, 1962 |

FOREIGN PATENTS

| | | |
|---|---|---|
| 1,040,907 | Germany | Oct. 9, 1958 |
| 219,133 | Australia | Nov. 24, 1958 |